United States Patent
Loehe

(10) Patent No.: US 11,623,258 B2
(45) Date of Patent: Apr. 11, 2023

(54) FREQUENCY-DEPENDENT DISTRIBUTION OF MANIPULATED VARIABLES FOR CHANGING THE ROLLING STOCK CROSS SECTION IN A ROLL TRAIN

(71) Applicant: Primetals Technologies Germany GmbH, Erlangen (DE)

(72) Inventor: Klaus Loehe, Fürth (DE)

(73) Assignee: PRIMETALS TECHNOLOGIES GERMANY GMBH

( * ) Notice: Subject to any disclaimer, the term of this patent is extended or adjusted under 35 U.S.C. 154(b) by 281 days.

(21) Appl. No.: 17/144,218

(22) Filed: Jan. 8, 2021

(65) Prior Publication Data

US 2021/0229146 A1    Jul. 29, 2021

(30) Foreign Application Priority Data

Jan. 24, 2020 (EP) .................................. 20153523

(51) Int. Cl.
*G05B 19/18* (2006.01)
*B21B 1/18* (2006.01)
(Continued)

(52) U.S. Cl.
CPC ................ *B21B 1/18* (2013.01); *B21B 37/28* (2013.01); *G05B 19/182* (2013.01); *B21B 37/36* (2013.01);
(Continued)

(58) Field of Classification Search
CPC ........... B21B 1/18; B21B 37/28; B21B 37/36; B21B 37/58; B21B 2263/02;
(Continued)

(56) References Cited

U.S. PATENT DOCUMENTS 9,547,290 B2    1/2017  Dagner
2001/0007200 A1*  7/2001  Ravenet .............. B21B 45/0218
                                                                72/236
(Continued)

FOREIGN PATENT DOCUMENTS

DE           3 8 23 767 A1    1/1989
DE    10 2015 223 600 A1    3/2017
(Continued)

OTHER PUBLICATIONS

Search Report dated Jul. 14, 2020 in corresponding European Patent Application No. 20153523.4.
(Continued)

*Primary Examiner* — Alicia M. Choi
(74) *Attorney, Agent, or Firm* — Ostrolenk Faber LLP

(57) ABSTRACT

Rolling stock (2) composed of metal is rolled in rolling stands (3a to 3f) of a roll train (1) under the control of a control device. The control device, on the basis of a variable ($\delta Q$) (which is characteristic of the change in the cross section with which the rolling stock (2) is supposed to run out of a rolling stand (3e) of the roll train (1)), first determines all provisional manipulated variables (Sb to Se) for the rolling stand (3e) and rolling stands (3b to 3d) located upstream of the rolling stand (3e), and uses said provisional manipulated variables to determine final manipulated variables (Sb' to Se'), which influence the cross section with which the rolling stock (2) runs out of the respective rolling stand (3b to 3e). The control device determines the provisional manipulated variables (Sb to Sd) for the upstream rolling stands (3b to 3d) by frequency filtering.

13 Claims, 6 Drawing Sheets

(51) Int. Cl.
 *B21B 37/28* (2006.01)
 *B21B 37/36* (2006.01)
 *B21B 37/58* (2006.01)

(52) U.S. Cl.
 CPC ............ *B21B 37/58* (2013.01); *B21B 2263/02* (2013.01); *B21B 2263/04* (2013.01)

(58) Field of Classification Search
 CPC ................. B21B 2263/04; B21B 38/02; B21B 2027/103; B21B 2269/04; B21B 2269/12; B21B 2271/025; B21B 13/02; B21B 37/00; B21B 37/52; G05B 19/182
 See application file for complete search history.

(56) References Cited

U.S. PATENT DOCUMENTS

2017/0252786 A1* 9/2017 Kotzian ................. B21B 38/04
2017/0259313 A1* 9/2017 Fairlie ..................... B21B 37/28
2021/0213500 A1* 7/2021 Maierhofer ............. B21B 37/74
2021/0394245 A1* 12/2021 Tachibana ............... B21B 37/18

FOREIGN PATENT DOCUMENTS

| | | |
|---|---|---|
| EP | 3 632 583 A1 | 4/2020 |
| RU | 2583550 C2 | 5/2016 |
| SU | 1705072 A1 | 1/1992 |

OTHER PUBLICATIONS

Russian Federation Office Action, dated Mar. 28, 2022, issued in corresponding Russian Patent Application No. 2020140208/05(074789). English translation. Total 17 pages.

* cited by examiner

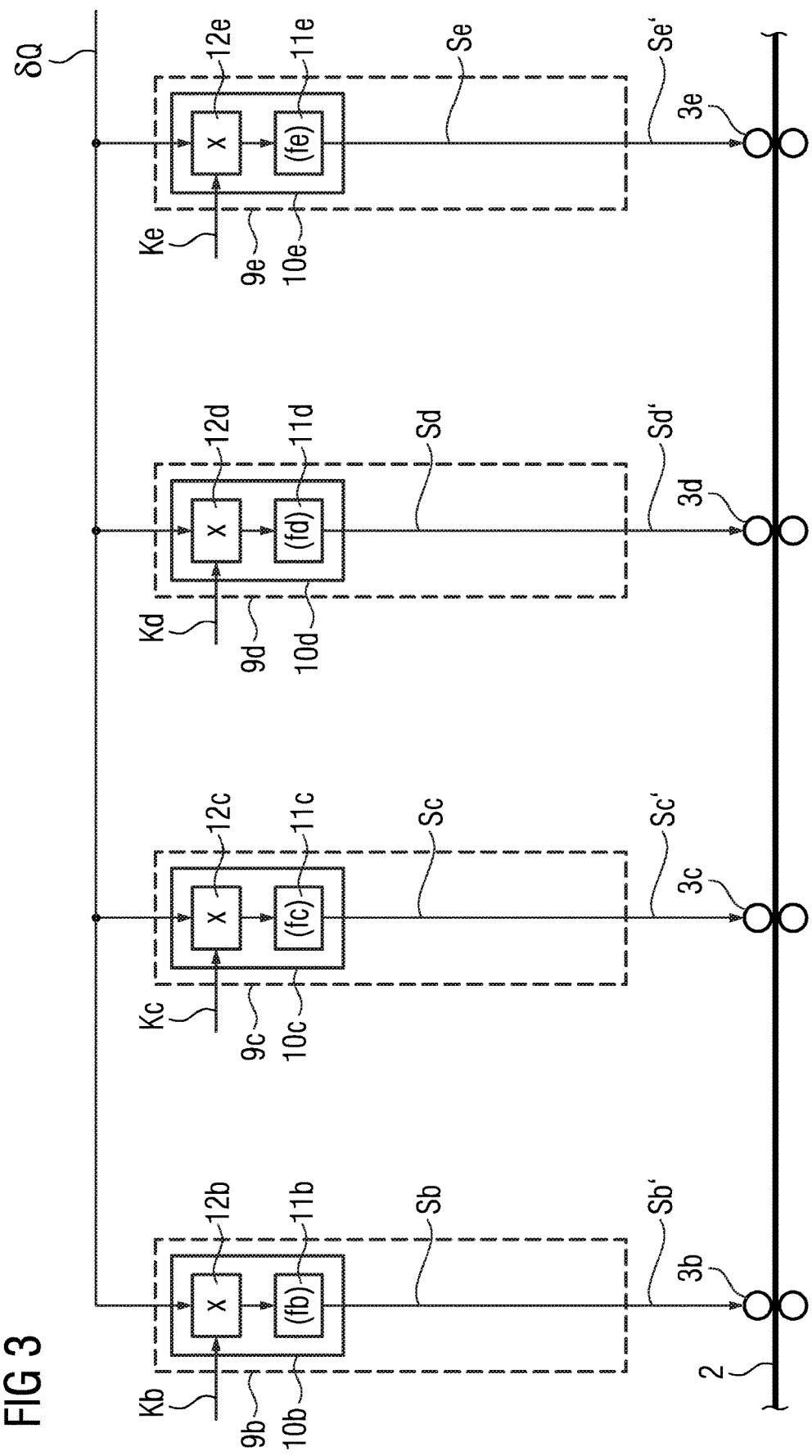

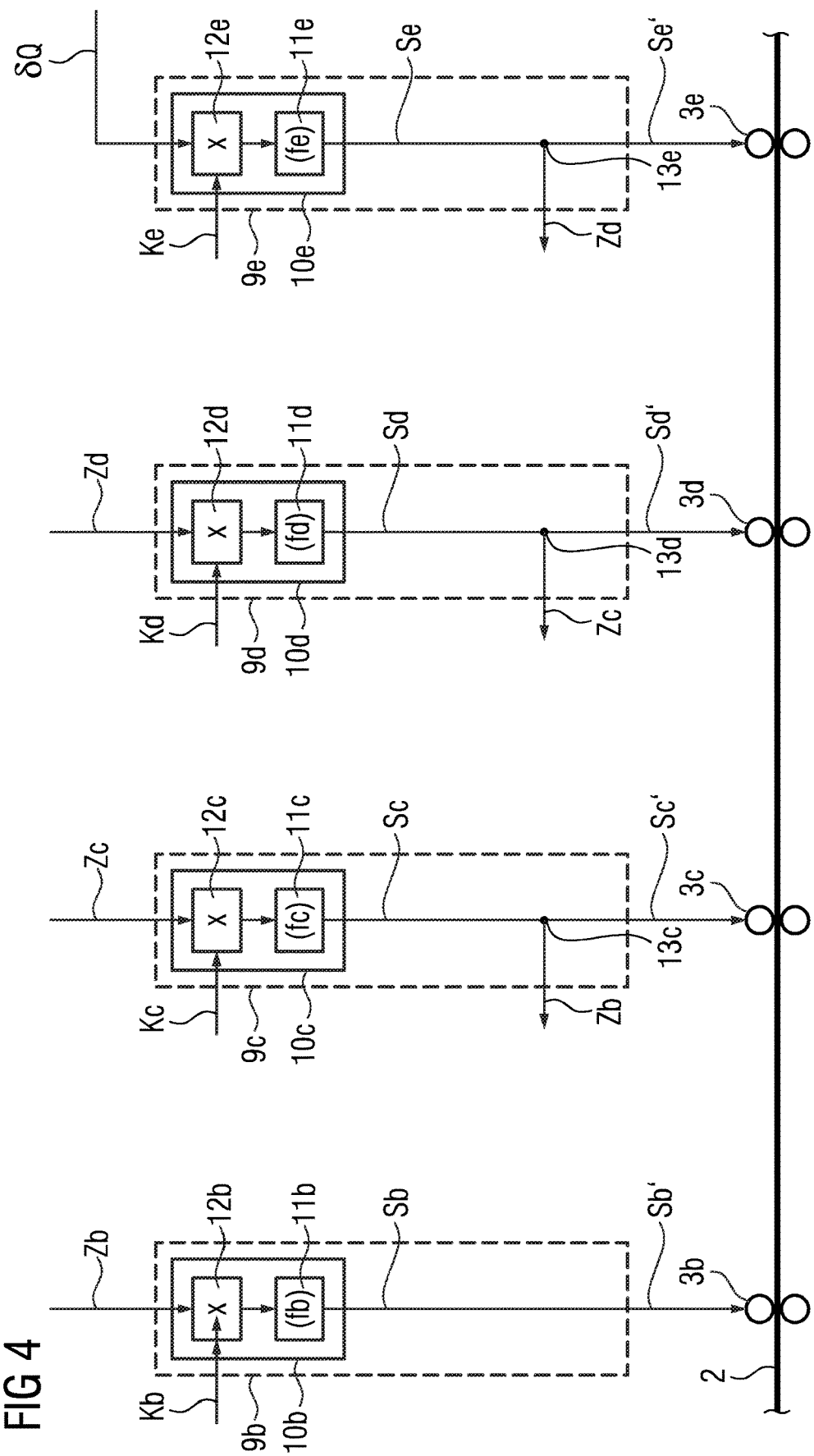

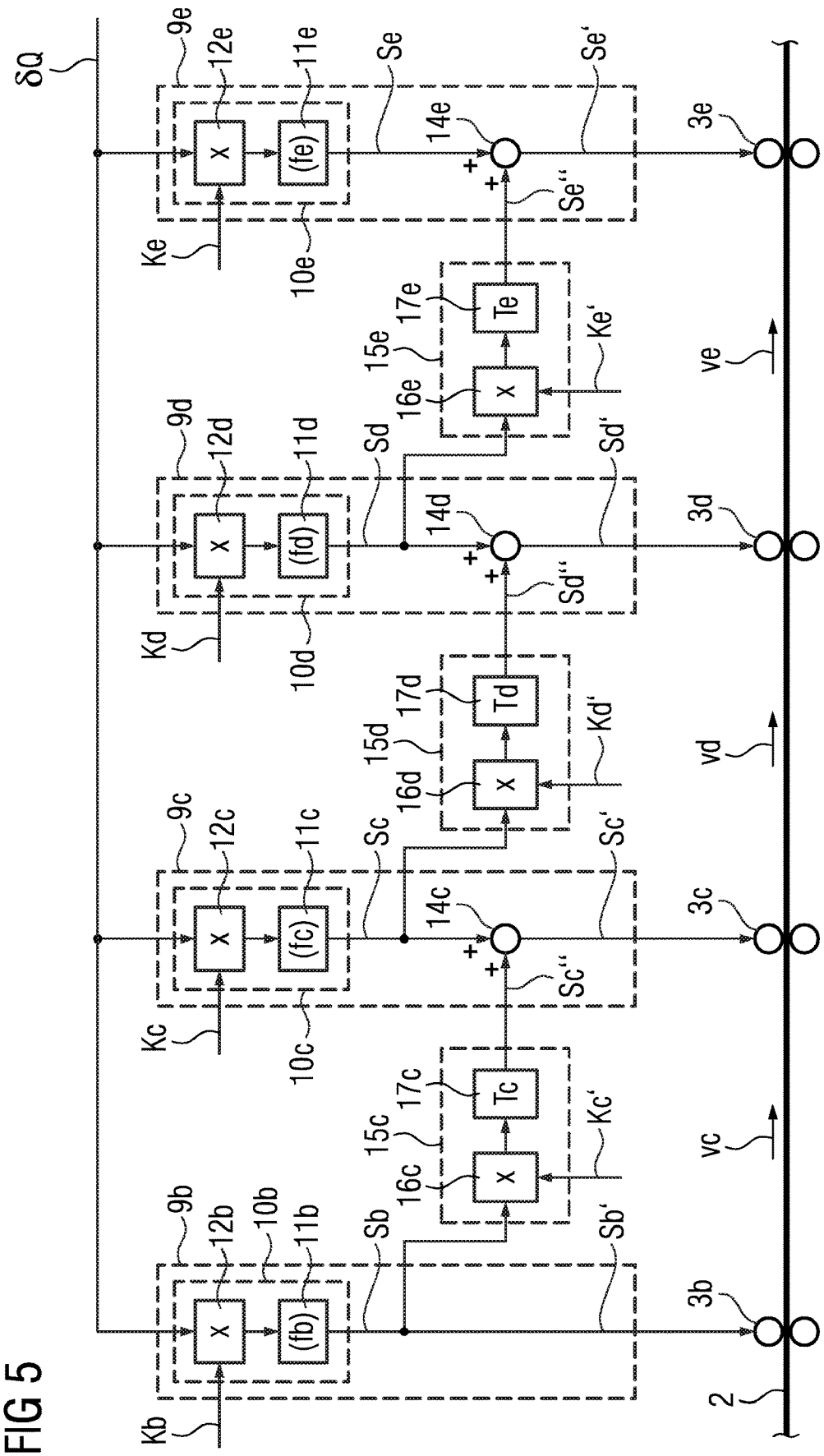

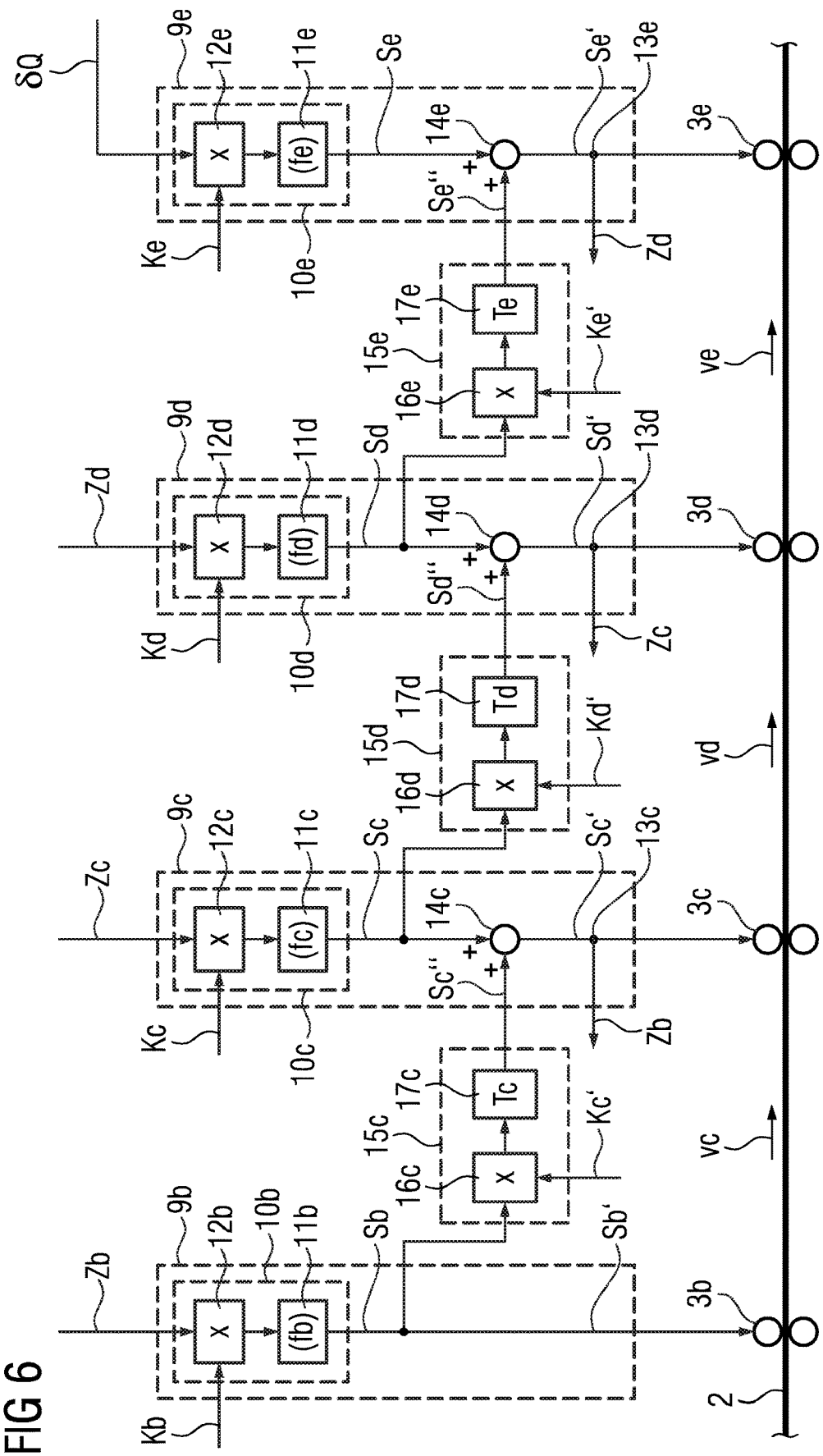

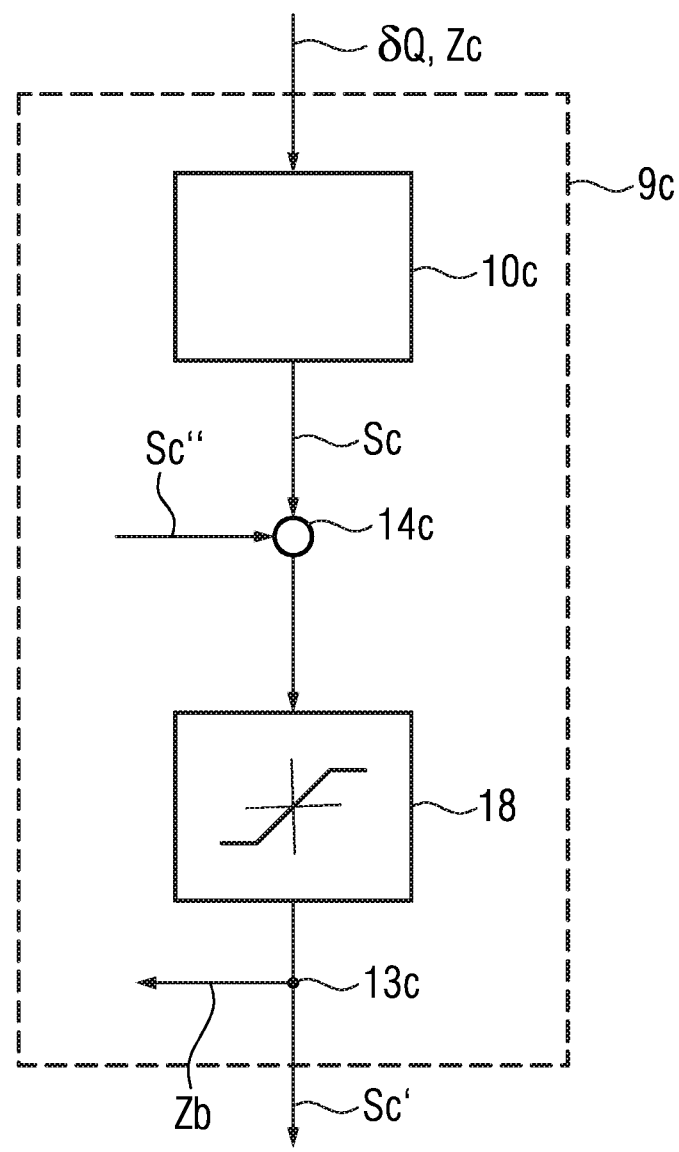

FREQUENCY-DEPENDENT DISTRIBUTION OF MANIPULATED VARIABLES FOR CHANGING THE ROLLING STOCK CROSS SECTION IN A ROLL TRAIN

CROSS-REFERENCE TO RELATED APPLICATIONS

The present application claims priority of European Patent Application No. EP 20153523.4 filed Jan. 24, 2020, the contents of which are incorporated by reference herein.

FIELD OF INVENTION

The present invention starts from an operating method for a roll train for rolling rolling stock composed of metal,
- wherein the roll train has a plurality of rolling stands, through which the rolling stock passes successively in a transfer direction that is uniform for the rolling stands, with the result that the rolling stock is rolled successively in the rolling stands,
- wherein, on the basis of a variable which is characteristic of the change in the cross section with which the rolling stock is supposed to run out of a particular rolling stand of the roll train, a control device of the roll train first of all determines, for this rolling stand and a number of rolling stands of the roll train which are arranged upstream of said rolling stand when viewed in the transfer direction, a respective provisional manipulated variable and, using the respective provisional manipulated variable, determines a respective final manipulated variable,
- wherein the respective final manipulated variable influences the cross section with which the rolling stock runs out of the respective rolling stand of the roll train,
- wherein the control device activates the rolling stands in accordance with the respective final manipulated variable.

The present invention furthermore starts from a control program, wherein the control program comprises program code, which can be executed by a control device for a roll train having a plurality of rolling stands, wherein the execution of the program code has the effect that the control device controls the roll train in accordance with an operating method of this kind.

The present invention furthermore starts from a control device for a roll train for rolling rolling stock composed of metal, wherein the roll train has a plurality of rolling stands, through which the rolling stock passes successively in a transfer direction that is uniform for the rolling stands, with the result that the rolling stock is rolled successively in the rolling stands,
- wherein the control device has determination paths, by means of which, on the basis of a variable which is characteristic of the change in the cross section with which the rolling stock is supposed to run out of a particular rolling stand of the roll train, the control device first of all determines, for this rolling stand and a number of rolling stands of the roll train which are arranged upstream of said rolling stand when viewed in the transfer direction, a respective provisional manipulated variable and, using the respective provisional manipulated variable, determines a respective final manipulated variable,
- wherein the respective final manipulated variable influences the cross section with which the rolling stock runs out of the respective rolling stand of the roll train,
- wherein the control device activates the rolling stands in accordance with the respective final manipulated variable.

The present invention furthermore starts from a roll train for flat rolling stock,
- wherein the roll train has a plurality of rolling stands, through which the rolling stock passes successively in a transfer direction that is uniform for the rolling stands, with the result that the rolling stock is rolled successively in the rolling stands of the roll train,
- wherein the roll train has a control device, by which the rolling stands of the roll train are controlled.

BACKGROUND

Rolling stock composed of metal—in particular metal strips—is often rolled in multi-stand roll trains. Particularly when rolling metal strip, maintaining a specified contour and maintaining a specified flatness are of great importance. In general, it is not possible to influence the contour and flatness independently of one another. In particular, they are decisively determined by the shape of the rolling gap ahead of a measurement location.

In order to maintain the contour and flatness, corresponding closed-loop control systems for the contour and flatness (or the profile and the flatness) are known. The closed-loop control systems can act on the roll bending, the roll pivoting, the roll displacement and/or the roll cooling of a particular rolling stand, for example.

If a control intervention is performed by these closed-loop control systems, i.e. a change in the rolling gap characteristic, the contour with which the metal strip runs out of the particular rolling stand changes. At the same time, the contour with which the metal strip runs out of the particular rolling stand is also the contour with which the metal strip enters the subsequent rolling stand. Thus, the flatness of the metal strip changes downstream of the subsequent rolling stand unless the rolling gap characteristic of the subsequent rolling stand is also changed in a corresponding manner.

An analogous situation applies in the other direction. If the contour of the metal strip downstream of a particular rolling stand is changed by a corresponding adjustment of the rolling gap of this rolling stand, the flatness downstream of this rolling stand also changes unless the preceding rolling stand is also adapted in a corresponding manner.

Thus, if the contour size of the rolling stock downstream of a particular rolling stand of the roll train is to be adjusted (e.g. downstream of the last rolling stand of the roll train), at least this rolling stand must be adjusted. The earlier European Patent Application 18 198 437.8 (filing date Oct. 3, 2018), which had not yet been published on the filing date of the present invention, describes an operating method for a roll train having a plurality of rolling stands in which, in addition, the rolling stand ahead of the particular rolling stand is also adjusted, thus enabling both the contour of the metal strip and the profile of the metal strip to be adjusted to their respective target values with the maximum possible dynamism. As a result, the flatness error is shifted into the interstand region between the particular rolling stand and the rolling stand upstream thereof.

In order to avoid a flatness error in this interstand region, it is also possible to adjust the contour in rolling stands arranged further upstream and to adapt the stands accordingly. The flatness error is thereby shifted further and further into the front region of the roll train. During rolling in the front rolling stands of the roll train, however, the metal strip is often still so thick that transverse flow of the material takes place during rolling and consequently no flatness errors occur. However, the dynamics of the closed-loop control system are dependent on the time it takes to transfer the metal strip from the first rolling stand involved to the measurement location. Owing to the large distance and the associated long transfer time, the contour cannot be set quickly and accurately with respect to a target in a relatively large roll train having seven rolling stands, for example, in the prior art.

SUMMARY OF THE INVENTION

The object of the present invention consists in creating possibilities by means of which the contour of the rolling stock can be set in a highly dynamic way, while, at the same time, flatness errors in interstand regions are avoided as far as possible.

The object is achieved by means of an operating method for a roll train having the claimed features.

According to the invention, an operating method for a roll train of the type stated at the outset is embodied in such a way that the control device determines the respective provisional manipulated variable for the upstream rolling stands by respective frequency filtering of the characteristic variable or of an intermediate variable determined from the characteristic variable, that the frequency filtering operations are configured in such a way that the determination of the respective provisional manipulated variable for the upstream rolling stands in each case includes only frequency components of the characteristic variable which are below a respective limiting frequency, and that, in respect of the number of rolling stands of the roll train which are upstream of the particular rolling stand when viewed in the transfer direction, the limiting frequency in each case remains the same or increases from rolling stand to rolling stand.

Thus, in the context of the present invention, there is a frequency distribution of changes of the contour. Rapid changes of the contour are compensated in a highly dynamic way in the rear rolling stands of the roll train, while slow changes in the contour are shifted to front rolling stands of the roll train. In this case, the shift is further forwards, the slower the changes of the contour. Ultimately, a highly dynamic closed-loop control system is thereby achieved, while, at the same time, the flatness error in the interstand regions between the rolling stands of the roll train is kept small. Moreover, the rear rolling stands are relieved of load.

The control device generally determines the provisional manipulated variable for the particular rolling stand of the roll train on the basis of the characteristic variable, in particular by frequency filtering of the characteristic variable. For the upstream rolling stands, the determination process is always a frequency filtering operation. During this process, it is possible for the control device to determine the provisional manipulated variables for the upstream rolling stands by frequency filtering of the characteristic variable. However, the control device preferably determines the provisional manipulated variables for the upstream rolling stands by frequency filtering of the respective intermediate variable. In this case, the control device preferably determines the respective intermediate variable on the basis of the final manipulated variable for the respective rolling stand which is arranged immediately downstream when viewed in the transfer direction. Determination on the basis of the respective intermediate variable has the advantage, in particular, that the filtering operations can be parameterized more easily. Moreover, residual unavoidable flatness errors in the metal strip in the interstand regions are generally smaller than in the case of determination on the basis of the characteristic variable itself.

The control device preferably determines the respective final manipulated variable for a respective rolling stand on the basis of the provisional manipulated variable for the respective rolling stand and a respective correction variable. During this process, the control device determines the respective correction variable on the basis of the provisional manipulated variable of the respective rolling stand arranged immediately upstream when viewed in the transfer direction. It is thereby possible, in activating the respective rolling stand, to take account of the change of the contour which has already been brought about by the upstream rolling stand or upstream rolling stands.

The control device preferably delays the respective correction variable relative to the provisional manipulated variable of the rolling stand arranged immediately upstream when viewed in the transfer direction by a respective delay time. It is thereby possible to accomplish time-coordinated application of the respective correction variable to the corresponding provisional manipulated variable.

The control device preferably limits the final manipulated variables by means of a respective limiting element. It is thereby possible, in particular, to take account of actuating limits of actuators.

The object is furthermore achieved by means of a control program having the claimed features.

The object is achieved by means of a control device for a roll train having the claimed features.

According to the invention, a control device for a roll train of the type stated at the outset is embodied in such a way that the determination paths of the upstream rolling stands have frequency filters, by means of which the control device determines the respective provisional manipulated variable for the upstream rolling stands by respective frequency filtering of the characteristic variable or of an intermediate variable determined from the characteristic variable, that the frequency filters are designed in such a way that the determination of the respective provisional manipulated variable for the upstream rolling stands in each case includes only frequency components of the characteristic variable which are below a respective limiting frequency, and that, in respect of the number of rolling stands of the roll train which are upstream of the particular rolling stand when viewed in the transfer direction, the limiting frequency in each case remains the same or increases from rolling stand to rolling stand, and that the determination path for the particular rolling stand is designed in such a way that the determination of the provisional manipulated variable for the particular rolling stand includes at least those frequency components of the characteristic variable which are above the limiting frequency of the rolling stand which is immediately upstream of the particular rolling stand when viewed in the transfer direction.

Thus, analogously to the operating method, there is frequency distribution of changes of the contour, with the result that rapid changes of the contour in the rear rolling stands of the roll train are compensated in a highly dynamic way, while slow changes of the contour are shifted to front rolling stands of the roll train.

The control device preferably feeds the characteristic variable to the determination path for the particular rolling stand of the roll train. Furthermore, the control device preferably has intermediate blocks, by means of which the control device determines the respective intermediate variable for the upstream rolling stands on the basis of the final manipulated variable for the respective rolling stand arranged immediately downstream when viewed in the transfer direction. Highly dynamic closed-loop control is thereby achieved. Moreover, the flatness error in the interstand regions between the rolling stands of the roll train is kept small. Finally, the rear rolling stands are relieved of load.

The determination paths preferably have nodes, at which the control device determines the respective final manipulated variable by addition of the respective provisional manipulated variable for the respective rolling stand and of a respective correction variable. In this case, the control device furthermore has bridge elements, by means of which the control device determines the respective correction variable on the basis of the final manipulated variable of the respective rolling stand arranged immediately upstream when viewed in the transfer direction. It is thereby possible, in activating the respective rolling stand, to take account of the change of the contour which has already been brought about by the upstream rolling stand or upstream rolling stands.

The bridge elements preferably have delay elements, by means of which the control device delays the respective correction variable with respect to the final manipulated variable of the rolling stand arranged immediately upstream when viewed in the transfer direction by a respective delay time. It is thereby possible to accomplish time-coordinated application of the respective correction variable to the corresponding provisional manipulated variable.

The determination paths preferably have a respective limiting element, by means of which the control device limits the respective final manipulated variable. It is thereby possible, in particular, to take account of actuating limits of actuators.

In accordance with the implementation of the invention by means of a control program, the control device is preferably designed as a software-programmable device.

The object is furthermore achieved by means of a roll train having the claimed features. According to the invention, the control device in a roll train of the type stated at the outset is designed as a control device according to the invention.

BRIEF DESCRIPTION OF THE DRAWINGS

The above-described properties, features and advantages of this invention and the manner in which these are achieved will become more clearly and distinctly comprehensible in conjunction with the following description of the illustrative embodiments, which are explained in greater detail in combination with the drawings. Here, in schematic illustration:

FIG. 3 shows a plurality of rolling stands of a roll train and an associated control system,
FIG. 4 shows a plurality of rolling stands of a roll train and an alternative associated control system,
FIG. 5 shows a modification of FIG. 3,
FIG. 6 shows a modification of FIG. 4,
and
FIG. 7 shows a determination path.

DETAILED DESCRIPTION OF THE EMBODIMENTS

Figure 1:
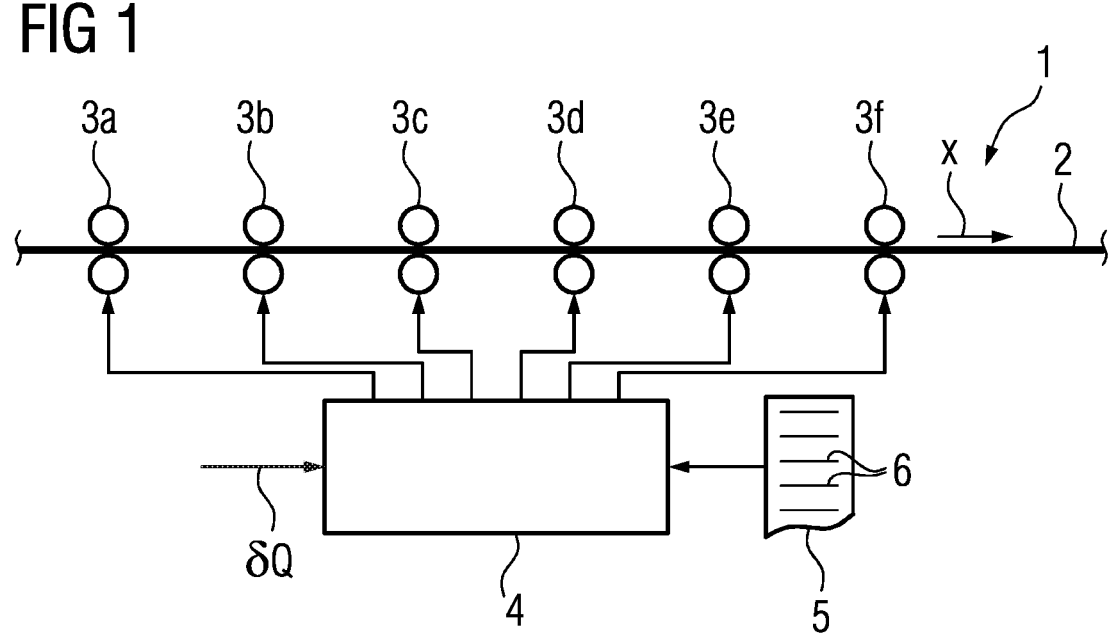
FIG. 1 shows a roll train for rolling flat rolling stock.

According to FIG. 1, elongate rolling stock 2 is rolled in a roll train 1. In general, the rolling stock 2 is flat rolling stock, in particular a strip. In individual cases, however, it may also be some other kind of elongate rolling stock, e.g. a profile. The profile can be an I-section profile, an H-section profile, a T-section profile etc. The material of the rolling stock 2 is generally steel or, in some cases, aluminum. In individual cases, however, it may also be rolling stock 2 composed of some other metal, e.g. of copper.

The rolling stock 2 is generally hot-rolled in the roll train 1. For example, the roll train 1 can be a finishing train for hot rolling a metal strip. However, cold rolling is not excluded. Irrespective of its further configuration, however, the roll train 1 has a plurality of rolling stands $3a$ to $3f$. A total of six rolling stands $3a$ to $3f$ is illustrated in FIG. 1. However, the roll train 1 could also have a larger number of rolling stands $3a$ to $3f$, e.g. seven or eight rolling stands $3a$ to $3f$. It is likewise also possible for the roll train 1 to have a smaller number of rolling stands $3a$ to $3f$, e.g. three, four or five rolling stands $3a$ to $3f$. The decisive factor is that there are at least two rolling stands $3a$ to $3f$ and that the rolling stock 2 passes successively through the rolling stands $3a$ to $3f$. An associated transfer direction x is uniform for the rolling stands $3a$ to $3f$. As the rolling stock 2 passes through the respective rolling stand $3a$ to $3f$, it is rolled and therefore its cross section is reduced.

Figure 2:
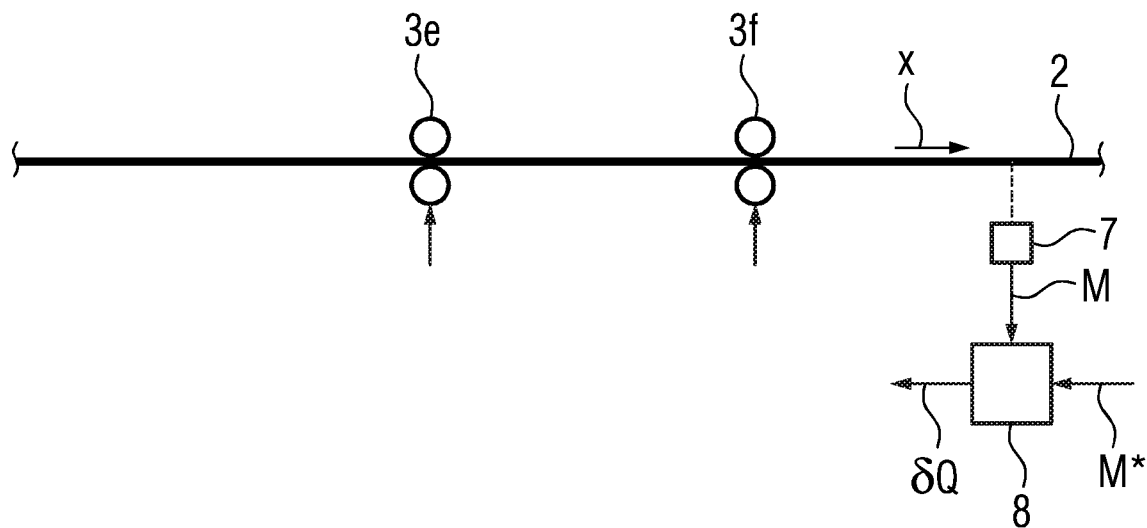
FIG. 2 shows rear rolling stands of a roll train.

The term "pass successively through" is not intended to mean that the rolling stock 2 is first of all fully rolled in one of the rolling stands $3a$ to $3f$ and only then fully rolled in the next one of the rolling stands $3a$ to $3f$ etc. On the contrary, the term is intended to mean that, although the rolling stock 2 is rolled simultaneously as a whole in a plurality of rolling stands $3a$ to $3f$, each individual section of the rolling stock 2 passes successively through the rolling stands $3a$ to $3f$ in sequence. Moreover, only the working rolls of the rolling stands $3a$ to $3f$ are illustrated in FIG. 1 and FIG. 2. In general, however, the rolling stands $3a$ to $3f$ have further rolls, in particular back-up rolls in the case of configuration as four-high stands, and back-up rolls and intermediate rolls in the case of configuration as six-high stands.

Where the terms "upstream" and "downstream" are used below, they relate without exception to the sequence in which the rolling stock 2 passes through the rolling stands $3a$ to $3f$. For example, rolling stands $3a$ and $3b$ are upstream of rolling stand $3c$, while rolling stand $3b$ is immediately upstream of rolling stand $3c$, and rolling stand $3a$ is not immediately upstream of rolling stand $3c$. In an analogous fashion, rolling stands $3d$, $3e$ and $3f$ are downstream of rolling stand $3c$, while rolling stand $3d$ is immediately downstream of rolling stand $3c$, and rolling stands $3e$ and $3f$ are not immediately downstream of rolling stand $3c$. Analogous statements apply to the relationships between the other rolling stands $3a$ to $3f$.

The roll train 1 and hence also the rolling stands $3a$ to $3f$ are controlled by a control device 4. In general, control device 4 is designed as a software-programmable control device. The control device 4 is programmed by means of a control program 5. The control program 5 comprises program code 6 that can be executed by the control device 4. In operation, the control device 4 executes the program code 6. The execution of the program code 6 by the control device 4 has the effect that the control device 4 controls the roll train 1 in accordance with an operating method which is explained in greater detail below.

A variable δQ, which is characteristic of the change in the cross section with which the rolling stock 2 is supposed to run out of a particular rolling stand 3a to 3f of the roll train 1, is known to the control device 4. The particular rolling stand 3a to 3f may be the last rolling stand 3f of the roll train 1. However, it is assumed below that it is the penultimate rolling stand 3e of the roll train 1. If the rolling stock 2 is a strip, the variable δQ is generally characteristic of a contour change. The characteristic variable δQ can be the desired cross-sectional change as such. Alternatively, it may be a variable from which the cross-sectional change can be determined. One example of such a variable is the flatness, to change which, in turn, the contour must be changed. As another alternative, it may be a variable which arises in the case of a given cross-sectional change in the context of determining the activation of the rolling stands 3a to 3f. It is assumed below that the characteristic variable δQ is the specified change itself. The characteristic variable δQ is thus referred to directly as the specified change. However, all the statements also apply if some other value, which can be converted into the desired cross-sectional change, is specified as the characteristic variable δQ.

It is possible that the specified change δQ is input into the control device 4 by an operator (not illustrated) by means of a corresponding control command. Alternatively, it is possible for example, in accordance with the illustration in FIG. 2, for a measuring device 7, by means of which an actual variable M of the rolling stock 2 is acquired, e.g. the contour and/or flatness in the case of flat rolling stock 2, to be arranged at a measurement location. Once the actual variable M has been acquired, the acquired actual variable M and, furthermore, an associated setpoint variable M*, can be fed to a closed-loop control device 8. In this case, the closed-loop control device 8 can use the actual variable M and the setpoint variable M* to determine the specified change δQ, in particular from the deviation of the actual variable M from the setpoint variable M*. The closed-loop control device 8 can be part of the control device 4.

As already mentioned, it is assumed in the context of the illustrative embodiment, that the specified change δQ acts on the penultimate rolling stand 3e of the roll train 1. This configuration is expedient particularly in the context of European Patent Application 18 198 437.8 of Oct. 3, 2018 already mentioned, which is not a prior publication. However, action on the penultimate rolling stand 3e of the roll train 1 is not absolutely essential. With the exception of the first rolling stand 3a of the roll train 1, the specified change δQ could also act on some other rolling stand 3a to 3f of the roll train 1.

According to the illustration in FIG. 3, the control device 4 has a number of determination paths 9b to 9e. One of the determination paths 9b to 9e—specifically determination path 9e—is assigned to the rolling stand 3e on which the specified change δQ acts. Moreover, a respective determination path 9b to 9d is likewise assigned to a number of rolling stands 3b to 3d, which are arranged upstream of said rolling stand 3e. The number of upstream rolling stands 3b to 3d for which there is a respective determination path 9b to 9d in the context of the procedure according to the invention can be as required. The minimum number is 1. In general, however, the number is greater than 1. The number can be such that there is also a determination path for the rolling stand 3a at the front of the roll train 1. However, it is assumed below that, when viewed in the transfer direction x, the first determination path 9b is for the second rolling stand 3b of the roll train 1.

The following embodiments relate without exception to the particular rolling stand 3e and to the rolling stands 3b to 3d which are arranged upstream of the particular rolling stand 3e and for which there is a determination path 9b to 9e, in this case therefore rolling stands 3b to 3e. The first and the last rolling stand 3a, 3f of the roll train 1 are not considered. In the context of the present invention, this applies in general to all of the rolling stands 3a to 3f arranged downstream of the particular rolling stand 3e and to all rolling stands 3a to 3f after the first rolling stand 3a for which there is no longer any determination path. This situation applies not only to FIG. 3 but also to FIGS. 4 to 7. As a matter of form, it should furthermore be mentioned that manipulated variables are determined for these rolling stands 3a, 3f too by the control device 4. These rolling stands 3a, 3f—that is to say, in the present case, the first and the last rolling stand 3a, 3f of the roll train 1—are not included in the present invention, however.

On the basis of the specified change δQ—which is intended as such for the particular rolling stand 3e—the control device 4 determines a respective provisional manipulated variable Sb to Se for the particular rolling stand 3e and also for the upstream rolling stands 3b to 3d in the determination paths 9b to 9e. Determination can take place in determination blocks 10b to 10e, for example.

The control device 4 activates the rolling stands 3b to 3e in accordance with respective final manipulated variables Sb' to Se'. The final manipulated variables Sb' to Se' influence the cross section with which the rolling stock 2 runs out of the respective rolling stand 3b to 3e of the roll train 1. The final manipulated variables Sb' to Se' can act on the respective rolling stand 3b to 3e as required. In the case of flat rolling stock 2, for example, they can act on the roll bending, on the roll cooling, on the roll lubrication, on the axial roll displacement, on a wedge setting etc.

The control device 4 determines the final manipulated variables Sb' to Se' using the respective provisional manipulated variable Sb to Se. In the context of the configuration in FIG. 3, the final manipulated variables Sb' to Sd' correspond directly and immediately to the provisional manipulated variables Sb to Sd. Even if a change in numerical values still takes place, the provisional manipulated variables Sb to Se and the final manipulated variables Sb' to Se' are at least in general similar, however. That is to say, if—purely by way of example—roll bending is determined as the provisional manipulated variable Sd, this roll bending can still be increased or reduced as part of the determination of the final manipulated variable Sd'. However, it is still the same type of manipulated variable, i.e. roll bending, for example.

The determination blocks 10b to 10d each have a frequency filter 11b to 11d. The change variable δQ is fed to the respective frequency filter 11b to 11d. By means of the frequency filters 11b to 11d, the control device 4 determines the respective provisional manipulated variable Sb to Sd by respective frequency filtering of the specified change δQ.

The frequency filters 11b to 11d are used to perform low-pass filtering. Thus, below a respective limiting frequency fb to fd, the signal fed to the respective frequency filter 11b to 11d remains unchanged or virtually unchanged while, above the respective limiting frequency fb to fd, the signal fed to the respective frequency filter 11b to 11d is filtered out, with the result that it is no longer contained in the output signal of the respective frequency filter 11b to 11d. As regards their construction, the frequency filters 11b to 11*d* can be designed according to requirements. They can be designed as Cauer filters or as Butterworth filters, for example. Other configurations are also possible, e.g. PT1 filters If required, the respective multiplier 12*b* to 12*d* can be arranged upstream of the respective frequency filter 11*b* to 11*d*. In this case, the change variable δQ can be multiplied in the respective multiplier 12*b* to 12*d* by a respective scaling factor Kb to Kd before being fed to the respective frequency filter 11*b* to 11*d*. Alternatively, the multipliers 12*b* to 12*d* can be arranged downstream of their respective frequency filter 11*b* to 11*d*. In this case, it is not the input signal of the respective frequency filter 11*b* to 11*d*—i.e. the change variable δQ—which is multiplied by the respective scaling factor Kb to Kd but the output signal of the respective frequency filter 11*b* to 11*d*. In this case, the provisional manipulated variables Sb to Sd correspond to the output signal of the frequency filters 11*b* to 11*d* after multiplication by the respective scaling factor Kb to Kd. In particular, the scaling factors Kb to Kd can be determined by the sensitivities of the rolling stands 3*b* to 3*d*.

The frequency filtering can be either linear or nonlinear. In the case of linear frequency filtering, the arrangement of the multipliers 12*b* to 12*d* upstream of the frequency filters 11*b* to 11*d* is equivalent to arrangement downstream of the frequency filters 11*b* to 11*d*. In the case of nonlinear frequency filtering, different effects are obtained, however.

Frequency filtering is always carried out for the rolling stands 3*b* to 3*d* arranged upstream of the particular rolling stand 3*e*. A fully analogous procedure is possible for determination path 9*e*. According to the illustration in FIG. 3, it is also adopted. Thus, there is also a frequency filter 11*e* and possibly also a multiplier 12*e* for determination path 9*e* and the associated determination block 10*e*. In this case the frequency filtering in determination block 10*e* is configured in such a way that the determination of the provisional manipulated variable Se for the particular rolling stand 3*e* includes at least those frequency components of the specified change δQ which are above the limiting frequency fd of the rolling stand 3*d*.

However, frequency filtering is not absolutely essential for determination path 9*e*. Alternatively, it is therefore likewise possible that there is no frequency filtering and therefore the specified change δQ—possibly after multiplication by an associated scaling factor Ke—is used as is as the provisional manipulated variable Se. In this case, the provisional manipulated variable Se itself contains the frequency components of the specified change δQ which are above the limiting frequency fd of the rolling stand 3*d*.

The frequency filters 11*b* to 11*d* (and, where applicable, also 11*e*) are configured in such a way that in each case only frequency components of the specified change δQ which are below a respective limiting frequency fb to fd or fe are included in the determination of the respective provisional manipulated variable Sb to Se. The respective limiting frequency fb to fd of a respective upstream rolling stand 3*b* to 3*d* is preferably determined by the transfer time from the respective upstream rolling stand 3*b* to 3*d* to the particular rolling stand 3*e*. The limited frequency fe of the particular rolling stand 3*e* is either virtually infinite (if there is no filtering at all) or (if there is filtering) so high that it has virtually no effect, i.e. the provisional sensor signal Se contains the signal component with the highest frequencies that can be used in practice.

It is the case here, on the one hand, that the limiting frequency fb of rolling stand 3*b* is lower than the limiting frequency fe of rolling stand 3*e*. For example, the limiting frequency fb can be 1 Hz, while, for rolling stand 3*e*, it is 20 Hz. In general, the limiting frequency fb to fe in each case increases from rolling stand 3*b* to 3*e* to rolling stand 3*b* to 3*e*. At the least, however, the limiting frequency fb to fe does not decrease from rolling stand 3*b* to 3*e* to rolling stand 3*b* to 3*e*. If, in accordance with the example just given, the limiting frequency fb of rolling stand 3*b* is 1 Hz and the limiting frequency fe for rolling stand 3*e* is 20 Hz, the limiting frequency fc of rolling stand 3*c* can be 3 Hz, and the limiting frequency fd of rolling stand 3*d* can be 8 Hz, for example. The numerical values mentioned should not be interpreted as restrictive, for example. They serve merely to provide a better explanation of the principle.

FIG. 4 shows an alternative to the procedure in FIG. 3. Therefore, only the essential differences with respect to FIG. 3 will be explored below.

In the context of the procedure in FIG. 4—as in FIG. 3—the provisional manipulated variables Sb to Se, and from these the final manipulated variables Sb' to Se', are determined. In contrast to the procedure in FIG. 3, in which the provisional manipulated variables Sb to Se for all the rolling stands 3*b* to 3*e* involved are determined directly on the basis of the specified change δQ, this is the case only for the provisional manipulated variable Se for the particular rolling stand 3*e* in the case of the procedure in FIG. 4. Thus, the specified change δQ is fed directly only to determination path 9*e*. A respective intermediate variable Zb to Zd is fed to the other determination paths 9*b* to 9*d*. The control device 4 thus determines the provisional manipulated variables Sb to Sd for the upstream rolling stands 3*b* to 3*d* by frequency filtering of the respective intermediate variable Zb to Zd. In turn, the control device 4 determines the respective intermediate variable Zb to Zd on the basis of the final manipulated variable Sc' to Se' for the respective rolling stand 3*c* to 3*e* arranged immediately downstream. Determination is performed in intermediate blocks 13*c* to 13*e*, which are part of the determination path 9*c* to 9*e*. In the simplest case, the intermediate blocks 13*c* to 13*e* are designed as a simple pickoffs.

In accordance with the illustration in FIGS. 3 and 4, it is possible for the control device 4 to take account, in each case exclusively, of the respective provisional manipulated variable Sc to Se in determining the respective final manipulated variable Sc' to Se'. However, the configurations in FIGS. 3 and 4 are preferably modified in accordance with illustrations in FIGS. 5 and 6. As part of the modification in FIGS. 5 and 6 the control device 4 determines the respective final manipulated variable Sc' to Se' for a respective rolling stand 3*c* to 3*e* on the basis of the provisional manipulated variable Sc to Se for the respective rolling stand 3*c* to 3*e* and of a respective correction variable Sc" to Se". In particular, the determination paths 9*c* to 9*e* have nodes 14*c* to 14*e*, at which the control device 4 determines the respective final manipulated variable Sc' to Se' by addition of the respective provisional manipulated variable Sc to Se for the respective rolling stand 3*c* to 3*e* and of the respective correction variable Sc" to Se".

The control device 4 determines the respective correction variable Sc" to Se" on the basis of the provisional manipulated variable Sb to Sd of the respective rolling stand 3*b* to 3*d* arranged immediately upstream. In particular, the control device 4 has bridge elements 15*c* to 15*e*, to which the provisional manipulated variable Sb to Sd of the respective rolling stand 3*b* to 3*d* arranged immediately upstream is fed and by means of which the control device 4 determines the respective correction variable Sc" to Se". In particular, the control device 4 can perform scaling with a corresponding scaling factor Kc' to Ke' in multipliers 16c to 16e of the bridge elements 15c to 15e, for example. In particular—analogously to the scaling factors Kc' to Ki'''—the scaling factors Kb to Kd can be determined by the sensitivities of the rolling stands 3b to 3e.

There is an exception to this procedure in the case of the forwardmost rolling stand 3b, which has a determination path 9b to 9d. The provisional manipulated variable Sb thereof is no longer corrected with a correction variable in the process of determining the associated final manipulated variable Sb'.

Insofar as it applies to the present invention, this also applies if at least one rolling stand 3a of the roll train 1—here rolling stand 3a—is additionally arranged upstream of the corresponding rolling stand 3b.

As illustrated in FIGS. 5 and 6, the bridge elements 15c to 15e furthermore preferably have delay elements 17c to 17e. By means of the delay elements 17c to 17e, the control device 4 delays the respective correction variable Sc'' to Se'' with respect to the provisional manipulated variable Sb to Sd of the rolling stand 3b to 3d arranged immediately upstream by a respective delay time Tc to Te. In general, the respective delay time Tc to Te is substantially determined by the respective transfer time which the rolling stock 2 requires to travel the distance from the respectively upstream rolling stand 3b to 3d to the respective rolling stand 3c to 3e. Thus, the respective delay time Tc to Te is generally determined by the distance between the respective rolling stand 3c to 3e and the respective rolling stand 3b to 3d arranged immediately upstream and by the respective rolling speed vc to ve at which the rolling stock 2 runs out of the respective rolling stand 3b to 3d arranged immediately upstream or runs into the respective rolling stand 3c to 3e. As an option, starting from the respective transfer time, the respective delay time Tc to Te can additionally be scaled with a respective scaling factor. In general, the respective scaling factor is between 0.5 and 2.0, mostly between 0.8 and 1.25. The scaling factors for the delay elements 17c to 17e can be determined uniformly or individually.

In the context of the embodiments according to FIGS. 3 to 6, frequency filtering is performed in the respective frequency filter 11b to 11e. FIG. 7 shows a possible configuration of the determination path 9c. Analogous statements apply to determination paths 9b, 9d and 9e.

In accordance with the illustration in FIG. 7, a limiting element 18 can be arranged downstream of the determination block 10c. In this case, the control device 4 limits the output signal of the determination block 10c by means of the limiting element 18. If node 14c is present, the limiting element 18 is arranged downstream of node 14c in the signal flow. If intermediate block 13c is present, the limiting element 18 is arranged upstream of intermediate block 13c in the signal flow.

As already mentioned, the control device 4 is generally designed as a software-programmable control device. The operation of the control device 4 is therefore effected by the control program 5. The control program 5 and the execution of the program code 6 thereof by the control device 4 therefore have the effect that the control device 4 implements the abovementioned functional units, e.g. the determination paths 9b to 9e or the intermediate blocks 13c to 13e or the bridge elements 15c to 15e, as software blocks.

The present invention has many advantages. In particular, actuating interventions to compensate the specified change δQ are distributed between several rolling stands 3b to 3e, and therefore the individual rolling stands 3b to 3e have to be activated only to a small extent. A highly dynamic process in the compensation of the specified change δQ can nevertheless be achieved.

Although the invention has been illustrated and described more specifically in detail by means of the preferred illustrative embodiment, the invention is not restricted by the examples disclosed, and other variants can be derived therefrom by a person skilled in the art without exceeding the scope of protection of the invention.

LIST OF REFERENCE SIGNS

1 Roll train
2 Rolling stock
3a to 3f Rolling stands
4 Control device
5 Control program
6 Program code
7 Measuring device
8 Closed-loop control device
9b to 9e Determination paths
10b to 10e Determination blocks
11b to 11e Frequency filters
12b to 12e Multipliers
13c to 13e Intermediate blocks
14c to 14e Nodes
15c to 15e Bridge elements
16c to 16e Multipliers
17c to 17e Delay elements
18 Limiting element
fb to fe Limiting frequencies
Kb to Ke Scaling factors
Kc' to Ke' Scaling factors
M Actual variable
M* Setpoint variable
Sb to Se Provisional manipulated variables
Sb' to Se' Final manipulated variables
Sc'' to Se'' Correction variables
Tc to Te Delay times
vc to ve Rolling speeds
X Transfer direction
Zb to Zd Intermediate variable

The invention claimed is:

1. An operating method for operating a roll train to roll rolling stock composed of metal, wherein the roll train has a plurality of rolling stands, through which the rolling stock passes successively in a transfer direction (x) that is uniform for the rolling stands, with a result that the rolling stock is rolled successively in the rolling stands, the method comprising:

based on a variable (δQ) which is characteristic of the change in a cross section with which the rolling stock is to run out of a particular rolling stand of the roll train, determining with a control device of the roll train, for the particular rolling stand and a number of upstream rolling stands of the roll train upstream of said particular rolling stand when viewed in the transfer direction (x), a respective provisional manipulated variable (Sb to Se), and determining with the control device a respective final manipulated variable (Sb' to Se') using the respective provisional manipulated variable (Sb to Se), the respective final manipulated variable (Sb' to Se') influencing the cross section with which the rolling stock runs out of the respective rolling stand of the roll train, and activating, with the control device, the rolling stands in accordance with the respective final manipulated variable (Sb' to Se'), wherein the control device determines the respective provisional manipulated variable (Sb to Sd) for the upstream rolling stands by respective frequency filtering of the characteristic variable (δQ) or of an intermediate variable (Zb to Zd) determined from the characteristic variable (δQ), wherein the frequency filtering operations are configured in such a way that the determination of the respective provisional manipulated variable (Sb to Sd) for the upstream rolling stands in each case includes only frequency components of the characteristic variable (δQ) which are below a respective limiting frequency (fb to fd), and wherein in respect of the number of the upstream rolling stands of the roll train, the limiting frequency (fb to fd) remains the same or increases from one rolling stand to another rolling stand, and wherein the control device determines the provisional manipulated variable (Se) for the particular rolling stand in such a way that the determination of the provisional manipulated variable (Se) for the particular rolling stand includes at least those frequency components of the characteristic variable (δQ) which are above the limiting frequency (fd) of the upstream rolling stand which is immediately upstream of the particular rolling stand when viewed in the transfer direction (x).

2. The operating method as claimed in claim 1, wherein the control device-determines the provisional manipulated variable (Se) for the particular rolling stand of the roll train based on of the characteristic variable (δQ) by frequency filtering of the characteristic variable (δQ), the control device determines the provisional manipulated variables (Sb to Sd) for the upstream rolling stands by frequency filtering of the respective intermediate variable (Zb to Zd), and the control device determines the respective intermediate variable (Zb to Zd) based on of the respective final manipulated variable (Sc' to Se') for the respective rolling stand arranged immediately downstream when viewed in the transfer direction (x).

3. The operating method as claimed in claim 1,
wherein the control device determines the respective final manipulated variable (Sc' to Se') for a respective rolling stand on the basis of the provisional manipulated variable (Sc to Se) for the respective rolling stand and of a respective correction variable (Sc" to Se"), and
the control device determines the respective correction variable (Sc" to Se") on the basis of the provisional manipulated variable (Sb to Sd) of the respective upstream rolling stand arranged immediately upstream when viewed in the transfer direction (x).

4. The operating method as claimed in claim 3, wherein the control device delays the respective correction variable (Sc" to Se") with respect to the provisional manipulated variable (Sb to Sd) of an upstream rolling stand arranged immediately upstream when viewed in the transfer direction (x) by a respective delay time (Tc to Te).

5. The operating method as claimed in claim 1, wherein the control device limits the final manipulated variables (Sb' to Se') by means of a respective limiting element.

6. A non-transitory computer readable storage medium configured to control a control device for a roll train having a plurality of rolling stands to control the roll train in accordance with an operating method as claimed in claim 1.

7. A control device for a roll train to roll rolling stock composed of metal, wherein the roll train has a plurality of rolling stands, through which the rolling stock passes successively in a transfer direction (x) that is uniform for the rolling stands, with the result that the rolling stock is rolled successively in the rolling stands, wherein the control device has determination paths, by means of which, based on of a variable (δQ) which is characteristic of the change in a cross section with which the rolling stock is to run out of a particular rolling stand of the roll train, the control device first determines, for the particular rolling stand and a number of upstream rolling stands of the roll train which are arranged upstream of said rolling stand when viewed in the transfer direction (x), a respective provisional manipulated variable (Sb to Se) and, using the respective provisional manipulated variable (Sb to Se), determines a respective final manipulated variable (Sb' to Se'), wherein the respective final manipulated variable (Sb' to Se') influences the cross section with which the rolling stock runs out of the respective rolling stand of the roll train, wherein the control device activates the rolling stands in accordance with the respective final manipulated variable (Sb' to Se'), wherein the determination paths of the upstream rolling stands have frequency filters, by means of which the control device determines the respective provisional manipulated variable (Sb to Sd) for the upstream rolling stands by respective frequency filtering of the characteristic variable (δQ) or of an intermediate variable (Zb to Zd) determined from the characteristic variable (δQ), wherein the frequency filters are designed in such a way that the determination of the respective provisional manipulated variable (Sb to Sd) for the upstream rolling stands in each case includes only frequency components of the characteristic variable (δQ) which are below a respective limiting frequency (fb to fd), wherein in respect of the number of upstream rolling stands of the roll train, the limiting frequency (fb to fd) remains the same or increases from one upstream rolling stand to another upstream rolling stand, and wherein the determination path for the particular rolling stand is designed in such a way that the determination of the provisional manipulated variable (Se) for the particular rolling stand includes at least those frequency components of the characteristic variable (δQ) which are above the limiting frequency (fd) of the upstream rolling stand which is immediately upstream of the particular rolling stand when viewed in the transfer direction (x).

8. The control device as claimed in claim 7, wherein the control device feeds the characteristic variable (δQ) to the determination path for the particular rolling stand of the roll train, the control device feeds the respective intermediate variable (Zb to Zd) to the determination paths for the upstream rolling stands, and the control device has intermediate blocks, by means of which the control device determines the respective intermediate variable (Zb to Zd) for the upstream rolling stands based on the final respective manipulated variable (Sc' to Se') for the respective rolling stand arranged immediately downstream when viewed in the transfer direction (x).

9. The control device as claimed in claim 7,
wherein the determination paths have nodes, at which the control device determines the respective final manipulated variable (Sc' to Se') by addition of the respective provisional manipulated variable (Sc to Se) for the respective rolling stand and of a respective correction variable (Sc" to Se"), and the control device has bridge elements, by means of which the control device determines the respective correction variable (Sc" to Se") on the basis of the provisional manipulated variable (Sb to Sd) of the respective upstream rolling stand arranged immediately upstream when viewed in the transfer direction (x).

10. The control device as claimed in claim 9, wherein the bridge elements have delay elements, by means of which the control device delays the respective correction variable (Sc" to Se") with respect to the provisional manipulated variable (Sb to Sd) of the upstream rolling stand ($3b$ to $3d$) arranged immediately upstream when viewed in the transfer direction (x) by a respective delay time (Tc to Te).

11. The control device as claimed in claim 7, wherein the determination paths have a respective limiting element, by means of which the control device limits the respective final manipulated variable (Sb' to Se').

12. The control device as claimed in claim 7, wherein the control device is designed as a software-programmable device.

13. A roll train for flat rolling stock, wherein the roll train has the rolling stands, through which the rolling stock passes successively in the transfer direction (x) that is uniform for the rolling stands, with the result that the rolling stock is rolled successively in the rolling stands, wherein the roll train has the control device, by which the rolling stands of the roll train are controlled, wherein the control device is designed as a control device as claimed in claim 7.

* * * * *